(12) United States Patent
Thijs et al.

(10) Patent No.: US 8,155,168 B2
(45) Date of Patent: Apr. 10, 2012

(54) INDUCTIVE COMMUNICATION SYSTEM WITH INCREASED NOISE IMMUNITY USING LOW-COMPLEXITY TRANSMITTER

(75) Inventors: Jeroen Thijs, Aachen (DE); Olaf Such, Aachen (DE); Robert Pinter, Aachen (DE); Jens Muehlsteff, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1010 days.

(21) Appl. No.: 11/917,514

(22) PCT Filed: Jun. 20, 2006

(86) PCT No.: PCT/IB2006/051993
§ 371 (c)(1),
(2), (4) Date: Dec. 14, 2007

(87) PCT Pub. No.: WO2006/137021
PCT Pub. Date: Dec. 28, 2006

(65) Prior Publication Data
US 2008/0205489 A1 Aug. 28, 2008

(30) Foreign Application Priority Data
Jun. 23, 2005 (EP) .................................. 05105614

(51) Int. Cl.
*H04B 1/707* (2006.01)
(52) U.S. Cl. ........ 375/142; 375/146; 375/242; 375/150; 375/241; 375/254
(58) Field of Classification Search .................. 375/142, 375/146, 242, 150, 241, 254
See application file for complete search history.

(56) References Cited

U.S. PATENT DOCUMENTS

| | | | | |
|---|---|---|---|---|
| 3,833,772 A * | 9/1974 | Getgen | ......................... | 370/285 |
| 4,307,615 A * | 12/1981 | Robinson | ......................... | 73/643 |
| 4,955,000 A * | 9/1990 | Nastrom | ......................... | 367/117 |
| 5,007,050 A * | 4/1991 | Kasparian et al. | ............ | 370/280 |
| 5,113,859 A * | 5/1992 | Funke | ................ | 607/4 |
| 5,132,986 A * | 7/1992 | Endo et al. | .................... | 375/142 |
| 5,504,776 A * | 4/1996 | Yamaura et al. | .............. | 375/141 |
| 5,628,324 A | 5/1997 | Sarbach | | |
| 5,825,806 A | 10/1998 | Tuttle et al. | | |
| 5,974,078 A | 10/1999 | Tuttle et al. | | |
| 6,266,362 B1 | 7/2001 | Tuttle et al. | | |
| 6,574,205 B1 * | 6/2003 | Sato | ............................. | 370/335 |
| 6,720,921 B2 | 4/2004 | Ripingill et al. | | |
| 2001/0046254 A1 | 11/2001 | Park | | |
| 2003/0069048 A1 * | 4/2003 | Liu et al. | ........................ | 455/569 |
| 2004/0258131 A1 * | 12/2004 | Margon | ......................... | 375/130 |
| 2005/0261797 A1 * | 11/2005 | Cyr et al. | ........................ | 700/121 |
| 2006/0154615 A1 * | 7/2006 | Palermo et al. | .................. | 455/73 |
| 2006/0284669 A1 * | 12/2006 | Moore | .......................... | 327/551 |
| 2007/0109708 A1 * | 5/2007 | Hussman et al. | .............. | 361/113 |

FOREIGN PATENT DOCUMENTS

| | | |
|---|---|---|
| EP | 0025234 A1 | 3/1981 |
| JP | 04003632 A | 1/1992 |
| JP | 07168987 A | 7/1995 |
| WO | 9925070 A2 | 5/1999 |

\* cited by examiner

*Primary Examiner* — Siu Lee (57) ABSTRACT

A modulator for a communications system includes a spread spectrum coder and a pulse code modulator having a signal input port connectable to a signal output port of the spread spectrum coder. The modulator performs a robust and error free modulation and coding scheme by using a modified spread spectrum scheme combined with pulse code modulation. The communication system contains a low data rate, noise robust modulation and coding scheme using a very simple transmitter. This results in a very straightforward transmitter circuit, reducing size and costs of the transmitter.

14 Claims, 7 Drawing Sheets

INDUCTIVE COMMUNICATION SYSTEM WITH INCREASED NOISE IMMUNITY USING LOW-COMPLEXITY TRANSMITTER

The present invention is generally directed to a one-way communication system, and in particular to a one-way communication system operating in the near field region of a transmitter.

Electromagnetic communication systems are typically required to fulfill a plurality of conditions. For example, the signal emitted by an emitter of the communication system must be strong enough to be reliably detected by a receiver of the communication system. Especially if one or both of emitter and receiver are located in the vicinity of conductive or magnetisable structures, a high transmitting power may be necessary in order to compensate for partial absorption of the signal. In addition, several noise sources are present in some common frequency ranges, such as the long wave range, increasing the need for a robust and error free modulation and coding scheme. Especially in medical applications, current techniques mainly consist of RF frequency transceivers that operate in the far field region. In the far field region the E-field component plays an important role in the propagation of the radio wave. In cases where the transmitter is close to the body, performance decreases dramatically because of high absorption levels of the human body. Especially in personal health care applications there is a need for small and cheap on-body transmitters to ensure convenience for users and keeping costs low.

Due to the above said, it becomes clear that the communication system has to be implemented using a very simple transmitter structure. At the same time, the communication system has to maintain an acceptable level of robustness against interfering noise power. The problem boils down to finding a modulator that is part of a transmitter, which adds noise robustness to the transmitter ideally without changing the simple transmitter structure.

In a preferred embodiment, a modulator for a communications system comprises a spread spectrum coder and a pulse code modulator having a signal input port connectable to a signal output port of the spread spectrum coder. Data to be transmitted is first processed by the spread spectrum coder and subsequently by the pulse code modulator. During operation of the modulator, a data signal exiting the spread spectrum coder via an output port of the latter is directed to an input port of the pulse code modulator. This arrangement has the advantage of a higher noise robustness while maintaining a relatively simple structure. In particular, noise robustness of the modulator is increased by the combination of spreading the spectrum of the transmission signal and encoding it by means of a distinct pulse code modulation pattern. Spread spectrum (SS) encoding renders a transmission signal less vulnerable to jamming caused by one or a few jamming transmitters, each emitting a signal at a distinct frequency. This desirable effect is achieved by dividing the transmission power of the transmission signal up within a relatively large frequency band so that, at the receiver-site, the signal can be reconstructed even if a portion of the frequency band is disturbed. The reason for having the modulator perform the spread spectrum encoding first and then the pulse code modulation is now explained. Spread spectrum encoding typically involves a logical or mathematical operation between the data signal and a so-called pseudo random noise (PRN) signal. The structure of the modulator as described above is easy to integrate into existing modulators structures, because the already existing pulse code modulation part is maintained. The proposed modulator structure differs only in the added spread spectrum coder at the signal entry of the pulse code modulator.

In a related embodiment of the present invention, the pulse code modulator is adapted to encode a spread spectrum coded signal, yielded by the spread spectrum coder, in a pulse-code modulated signal. This feature allows the concatenation of the spread spectrum coder and the pulse code modulator.

In a further related embodiment, the pulse code modulator is adapted to encode an instantaneous value of the spread spectrum coded signal into a sequence that is part of the pulse-code modulated signal. A mapping function or table yields partial sequences of the pulse-code modulated signal that are each representative for an instantaneous value of the spread spectrum coded signal, respectively. Pulse code modulation is a time division modulation technique in which analogue signals are sampled and quantized at periodic intervals into digital values. The spread spectrum signal, although generated by means of a digital operation, still has an analogue representation, which might for example be obtained by a hold element resulting in a piecewise constant output signal. Notwithstanding, such a digital-to-analogue conversion might be unnecessary if the pulse code modulator accepts a digital input signal directly. Correspondingly, instead of sending an analogue signal from the spread spectrum coder to the pulse code modulator, a sequence of digital values could be used as well.

Another embodiment of the present invention is directed to a transmitter comprising a modulator as described above, which further comprises a pseudo noise generator connectable to the spread spectrum coder. Hence, the modulator is part of a transmitter that is used to transmit a data signal or some other type of signal over a transmission channel. In order to perform a spread spectrum (SS) encoding, a so-called pseudo-noise signal is needed, which is basically a random sequence. This pseudo-noise signal can be generated by a pseudo-noise generator. These sequences are also called "keys", which must be known in advance by both, the transmitter and the receiver. In modern communications, the sequences must be as long and as random as possible to appear as "noise-like" as possible. But in any case, they must remain reproducible. Otherwise, the receiver will be unable to extract the message that has been sent. Thus, the sequence is "nearly random." Such a code is called a pseudo-random number (PRN) or sequence. To guarantee efficient SS communications, the PRN sequences must respect certain rules, such as length, auto-correlation, cross-correlation, orthogonality, and bit balancing. Primarily, the correlation characteristics of the different sequences are crucial for their applicability in a spread spectrum communication system. Some popular pseudo random sequences are: maximum-length, Barker, Gold, Hadamard-Walsh, etc.

In a related embodiment the transmitter further comprises a resonant circuit and switching means adapted to alternatingly energize and de-energize the resonant circuit in response to a signal generated by the modulator. When excited by an input signal such as a unit step function, the resonant circuit responds with a characteristic output signal. This output signal features a certain resonance frequency and a damping factor, both of which are characteristic of the resonant circuit. The resonance frequency of the resonant circuit can be chosen to be situated in a frequency band that is preferred for transmission over a certain transmission channel. The damping factor assures that an input signal decays after a certain time so that the resonant circuit does not accumulate all the input signals of the past. These two features make it possible that the resonant circuit may be driven by a signal that is generated by the modulator as described above. In particular, if the drive signal is comprised of pulses, the resonant circuit will react to the rising edge of the prevailing pulse by starting to oscillate at substantially its resonance frequency.

Likewise, the resonance circuit reacts to the falling edge of the pulse by decaying in its oscillation until the oscillation becomes imperceptible. One advantage is that no standard modulation element, such as a multiplier or a voltage controlled oscillator, needs to be employed. Rather, the transmission signal of the desired carrier frequency is obtained by above mentioned unit step response of the resonant circuit, which simplifies the transmitter and decreases its power consumption.

In a related embodiment the resonant circuit has a resonance frequency in the long wave range. A radio communication in the long wave range is advantageous, because a long wave signal is less absorbed by certain structures, such as a human body, than signals having a shorter wave length. Since a spread spectrum encoding is used, even the rather crowded long wave range offers sufficient bandwidth for the intended data communication. This is because, for any other communications system operating in the long wave range, the transmitted signal practically vanishes in the noise floor so that it does not present a jamming transmitter for these communications systems. Moreover, the transmitted signal can exploit an arbitrarily big portion of the long wave range. It only needs to be made sure that the lower and upper bounds of the transmission range are still within the specifications of the transmission channel.

In a further embodiment, the transmitter further comprises a magnetic transducer. Such a magnetic transducer produces a strong B-field. The advantage of using a magnetic transducer communications is that in the near field region the electromagnetic radio waves have a small E-field component and a large B-field or H-field component. This is advantageous in environments where the electrical field is strongly absorbed while the magnetic field is hardly influenced. This is the case in the vicinity of materials that are electrically conducting but non-magnetic.

In another preferred embodiment according to the present invention a demodulator for a communications system corresponds to a transmitter within the communications system. The demodulator comprises a correlator that is adapted to perform a correlation of a received signal and a reference signal, wherein the reference signal is representative of the system response of the transmitter when excited by a particular pulse-code modulated sequence, the particular pulse-code modulated sequence being representative of a selected pulse-code modulated value. The task of the demodulator is to determine if the received signal corresponds to or contains a signal that has been transmitted by the corresponding transmitter. Furthermore, the demodulator has the task of determining the instantaneous value of the received signal, i.e. the value that is represented by the signal at a given moment. A correlator performing a correlation between the received signal and a reference signal, i.e. a cross correlation of both signal, is well suited for this task. The reference signal is obtained from the system response of the transmitter when the same is excited by a particular pulse code modulated sequence. Accordingly, each time the correlator or some additional component asserts that the cross correlation of received signal and reference signal is essentially equal to the autocorrelation of the reference signal, it is assumed that the received signal represents the above mentioned selected pulse code modulated value. In the contrary case, if the cross correlation between received signal and reference signal is essentially similar to the cross correlation between the reference signal and the system response of the transmitter when excited by a particular pulse-code modulated sequence, wherein the particular pulse-code modulated sequence is representative of another pulse-code modulated value. Under the condition that the pulse code modulated sequences representing different values are carefully chosen, the various autocorrelation and cross correlation functions are well distinguishable.

In a related embodiment the demodulator further comprises a peak detector, an input port of which being connectable to an output port of the correlator. The peak detector analyses the correlation between received signal and reference signal in order to determine, if the received signal corresponds to a transmitted signal (rather than just noise) and if so, which value is encoded in the received signal. In particular, the correlation between received signal and reference signal typically features a couple of peaks. The number, position and size of the peaks is representative of the correlation and hence for the received signal, because the reference signal remains constant. Accordingly, by evaluating the peaks of the correlation, the peak detector is capable of determining the presence and the value of a signal that was transmitted by the transmitter.

In a related embodiment the demodulator further comprises a spread spectrum decoder, an input port of which being connectable to an output port of the peak detector. This allows the output sequence of the peak detector to be decoded or despreaded by means of the pseudo-noise sequence that was used to encode the spread spectrum encoded signal. Since the principles for generating the pseudo noise sequences are defined in an identical manner for the emitter and the receiver, the receiver is capable of producing the same pseudo noise sequence as the emitter. However, the synchronization of both sequences in not known. The synchronization can be determined by a preamble or header which is detected by the receiver and used as a trigger for the receiver-site pseudo-noise generator. If the receiver-site pseudo-noise sequence is identical and synchronized to the emitter-site pseudo-noise sequence, the despreading operation can be successfully performed. The result of the despreading operation is the original data sequence as it was entered into the sent-side transmitter.

In a further preferred embodiment, a data transmission system comprises a sent-site spread spectrum encoder and a receive-site spread spectrum decoder. The data transmission system further comprises a sent-site pulse-code modulator and a receive-site pulse-code demodulator interposed between the spread spectrum encoder and the spread spectrum decoder. Such an arrangement is advantageous in that an already existing transmission system based on pulse code modulation can be provided with superior noise robustness. By keeping the inner part of the transmission system consisting of the sent-site pulse code modulator and the receive-site demodulator, it is possible to employ an already developed and tested structure. This is especially important if the elements that are used for pulse code modulation are part of an integrated circuit, which would have to be almost completely redesigned, if, for example, a spread spectrum encoding/decoding stage were intended to be included in between the pulse code modulation/demodulation stages.

In a related embodiment, the data transmission system further comprises a sent-site transmitter circuit, the transmitter circuit comprising a resonant circuit and switching means adapted to alternatingly energize and de-energize the resonant circuit in response to a signal generated by the pulse-code modulator. As explained above, the oscillation behavior of a resonant circuit is exploited in the present data transmission system, especially when the resonant circuit is excited by e.g. a sequence of unit step functions forming a signal as it is generated by the pulse code modulator.

In a related embodiment, the pulse-code demodulator comprises a correlator and a peak detector. The combination of a correlator and a peak detector allows for the comparison of a received signal with a reference signal and identification of the received signal based on the number, position and size of any peaks appearing in the correlation between the received signal and the reference signal.

In a related embodiment, the correlator takes as input a signal as it is transmitted on a transmission channel between a sender and a receiver of the data transmission system. In doing so the correlator is capable of performing a correlation on the original signal, which has not undergone any additional processing.

In another preferred embodiment according to the present invention, a method for transmitting data from a transmitter to a receiver comprises the steps of:

performing a spread spectrum encoding on a signal representative of said data yielding a spread spectrum coded signal; and performing a pulse code modulation on the spread spectrum coded signal yielding a pulse-code modulated signal.

For noise robustness, the step of spread spectrum encoding is performed before the step of pulse code modulation, which has advantages with respect to cost and performance.

In a related embodiment, the method further comprises the steps of:

receiving the pulse-code modulated signal;

performing a correlation of the pulse-code modulated signal and a reference signal to obtain a cross-correlation, wherein the reference signal is representative of the system response of the transmitter when excited by a pulse-code modulated sequence, the pulse-code modulated sequence being representative of a selected value out of possible values of the spread spectrum coded signal; and performing a peak detection on the cross-correlation.

By performing a correlation between a received signal and a reference signal, a meaningful measure for their similarity can be obtained. The correlation, or cross correlation to be exact, is a function, which can be analyzed by means of a peak detection determining the number, position and size of the various peaks in the cross correlation function.

In a related embodiment, the method further comprises the steps of:

alternatingly energizing and de-energizing a resonant circuit in response to the pulse-code modulated signal yielding a transmission signal; and sending the transmission signal over a transmission channel.

For pulse code modulated data, alternatingly energizing and de-energizing a resonant circuit is well suited to modulate a signal up to the resonant frequency of the resonance circuit. Transistors, which are possibly acting as switching elements and are used for the energizing and de-energizing actions, can be operated in a low power consuming mode, because power consuming intermediate operating states are mostly avoided.

A more complete appreciation of the invention and many of the attended advantages thereof will be readily obtained as the same becomes understood by reference to the following detailed description when considered in connection with the accompanying drawings, wherein.

Figure 1A:
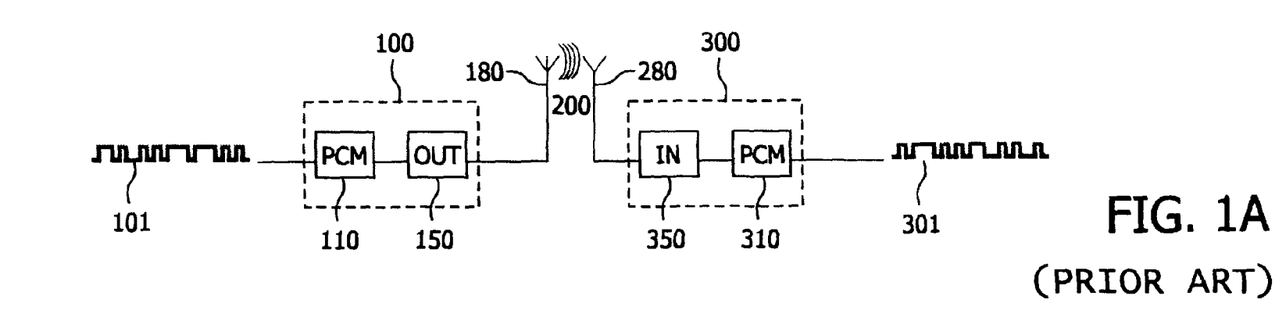
FIG. 1A is a block diagram of a transmission system according to the prior art.

Referring now to FIG. 1A a transmission system according to the prior art for digital data communication is shown. A serial digital data signal 101 to be transmitted serves as input for the transmission system. Input signal 101 is fed to a transmitter 100. Transmitter 100 comprises a pulse code modulator 110 and an output stage 150. Moreover, transmitter 100 is connected to a transducer element 180 such as an antenna in the case of radio frequency communication. The signal emitted by transducer 180 travels along a transmission channel 200 to another transducer 280, which is located at the receiver site and connected to a receiver 300. The signal picked up by transducer 280 enters an input stage 350 of receiver 300. Having passed input stage 350 and having undergone the corresponding processing the signal is fed to a pulse-code demodulator 310, which provides output signal 301 at its output. Assuming transmission channel 200 to be ideal, output signal 301 can be expected to be equivalent to input signal 101. In real live applications, however, transmission channel 200 is subject to several impairments, such as signal propagation delay, distortion and noise. Although, the technique of pulse-code modulation is satisfactory in this respect for many applications, it finds its limits in transmission systems employing a transmission frequency that is situated in a frequency range which is already widely-used. If such frequency range is used, the receiver may have trouble distinguishing the signal, which it is supposed to receive, from the general noise floor.

Figure 1B:
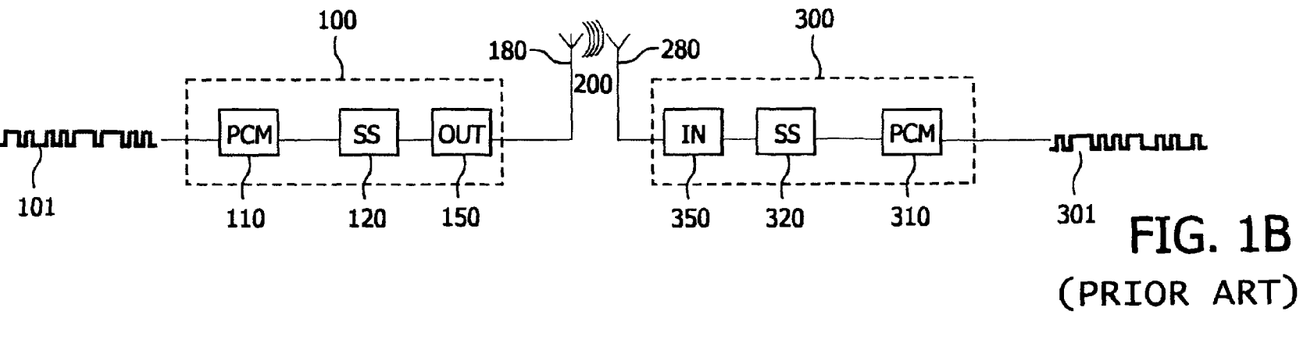
FIG. 1B is an advanced transmission system according to the prior art.

Referring now to FIG. 1B, an advanced transmission system is shown, in which the so called spread spectrum technique is used to overcome the above mentioned problem. With the spread spectrum technique the base band signal bandwidth is intentionally spread over a larger bandwidth with by injecting a higher-frequency signal. As a direct consequence, energy used in transmitting the signal is spread over a wider bandwidth. This usually means that the signal vanishes in the noise floor. By performing a de-spreading operation at the receiver site, the original signal can be restored under the condition that the de-spreading operation corresponds to the spreading operation. In FIG. 1B the spread spectrum block 120 is disposed between the pulse-code modulation block 110 and the output stage 150. Correspondingly, the block performing the de-spreading operation 320 is disposed between the input stage 350 and the pulse-code demodulation block 310. Since the spread spectrum technique has an influence on the bandwidth of the transmitted signal, such an arrangement allows a direct control of the transmitted signal and the required bandwidth by means of the spreading and de-spreading operations.

Figure 1C:
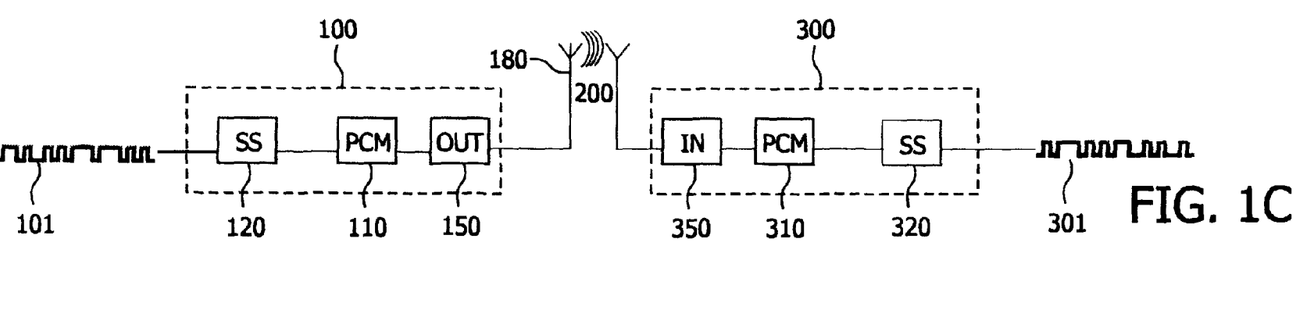
FIG. 1C is a transmission system according to the present invention.

FIG. 1C shows a transmission system according to the present invention, in which input signal 101 is first processed by spread spectrum encoding block 120 before it is passed on to a pulse-code modulation block 110. Likewise, a spread spectrum decoding block 320 within receiver 300 takes the output of pulse-code demodulator 310. Spread spectrum block 320 then yields output signal 301. Accordingly, the spreading and de-spreading operations of the spread spectrum technique define a transmission system as depicted in FIG. 1C.

Figure 2:
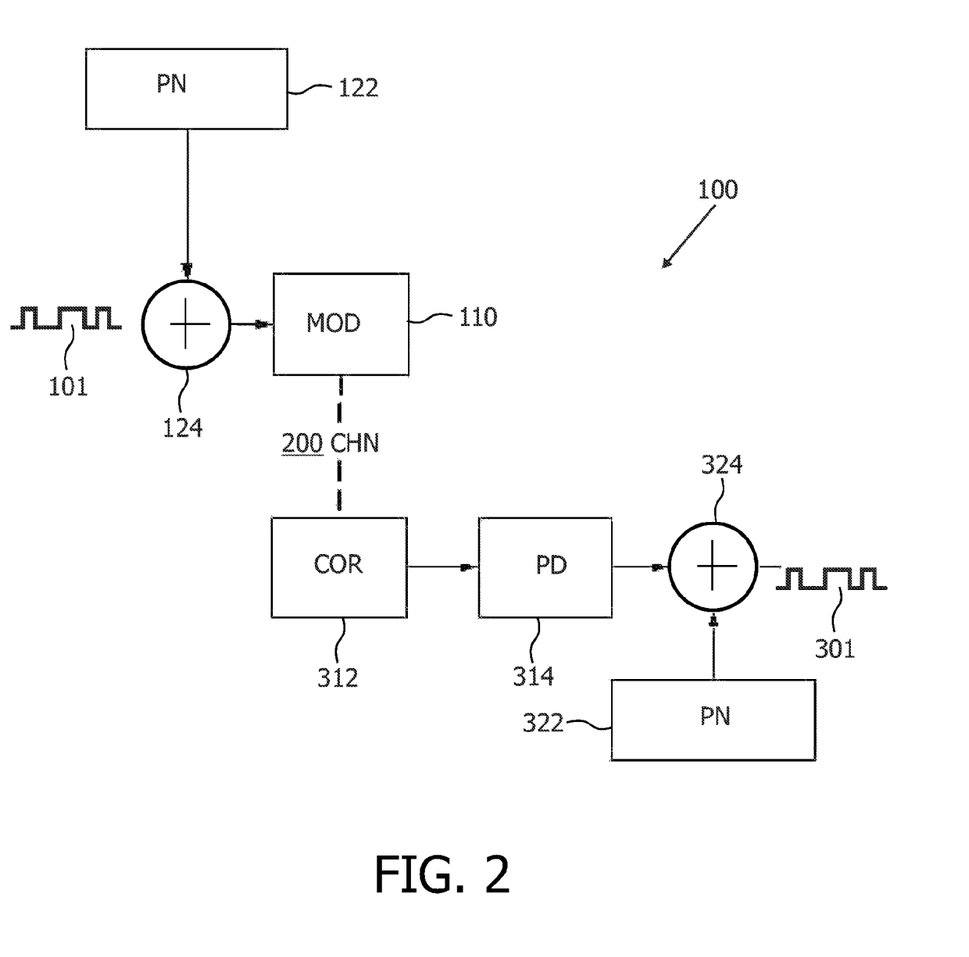
FIG. 2 is a more detailed block diagram of the transmission system according to the present invention.

Referring now to FIG. 2, a more detailed representation of the transmission system according to the present invention is shown. Input signal 101 enters an operational block 124, in which it is combined with a pseudo-noise (PN) signal generated by a pseudo-noise generator 122. Operational block 124 may perform for example an XOR operation, an addition and subsequent modulo operation or some other operation to combine input signal 101 and the pseudo noise signal. The pseudo-noise generator generates pseudo-noise random sequences. These sequences can be maximum length sequences or, better yet, Gold sequences with a chip rate of 500 chips/second. In the described example the input data is added (modulo 2) to the bits from the PN generator, which yields a new binary signal.

Figure 3A:
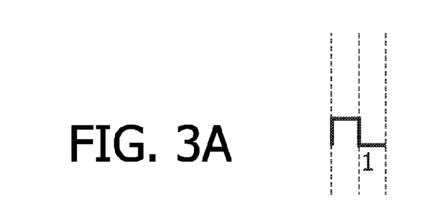
FIGS. 3A and 3B are illustrations of two signal motifs used in a pulse code modulator according to the present invention.
Figure 3B:
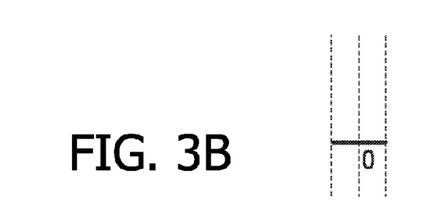
Figure 3C:
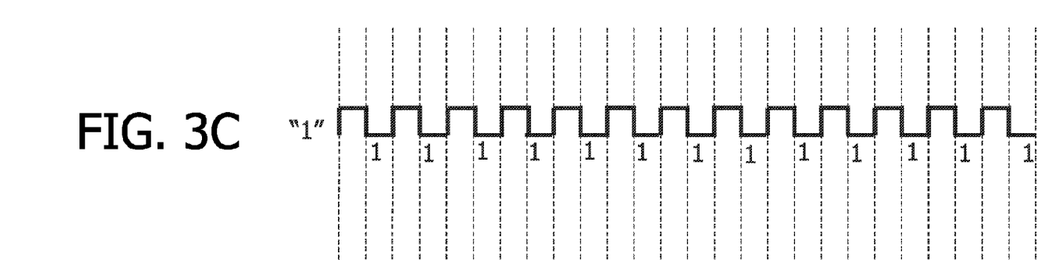
FIGS. 3C and 3D are illustrations of two portions of a pulse code modulated signal for two different encoded logical values.
Figure 3D:
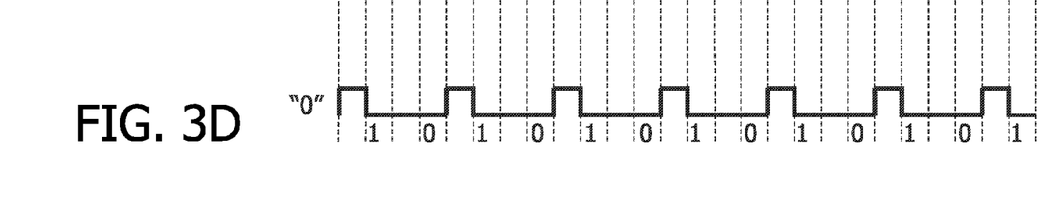

In modulator 110 the resulting signal is then modulated in the following form, which is purely exemplary. If the instantaneous value of the binary signal previously determined by operation block 124 is a logical 1, then a binary motif consisting of one square pulse is repeated e.g. 13 times. This becomes clear by contemplating FIGS. 3A-3D. FIG. 3A shows the motif consisting of a square pulse. FIG. 3B shows an alternative motif consisting of a flat line. FIG. 3C shows, how the motif of FIG. 3A is repeated 13 times in order to yield a pulse-code modulated representation of a logical 1 of the signal that is yielded by the operational block 124. Likewise, the pulse-code modulated representation of a logical 0 of the signal yielded by operational block 124 is shown in FIG. 3D. This pulse-code modulated representation is an alternation of the motif of FIG. 3A and FIG. 3B. As can be seen, the motif of FIG. 3A is repeated seven times while the motif of FIG. 3B is repeated six times. This operation can also be understood in the following way. A logical 1 of the signal yielded by the operational block 124 is mapped to the pulse-code modulated value "1111111111111". A logical 0 of the signal yielded by the operational block 124 is mapped to the pulse-code modulated value "1010101010101". Referring back to FIG. 2, this signal is transmitted across channel 200 to the receiver. On the receiver site, the signal is picked up by a correlator 312, performing a correlation between the received signal and a reference signal. The reference signal may be one of the signals represented in FIG. 3C or 3D. In the alternative, the reference signal may also be another signal, which takes into account for example a particular property of the channel 200, such as an oscillating behavior or a low pass characteristic. In any event, the correlator 312 calculates a more or less pronounced correlation function, depending on the similarity between the received signal and the reference signal. Typically such a correlation function shows at least one peak. In the case of a periodic signal the correlation function shows several peaks. The correlation function is therefore passed on to a peak detector 314 that determines e.g. the number, position and size of the peaks of the correlation function. By comparing the determined values for the number, position and size of the peaks with pre-determined values, the peak detector is capable of determining the binary value of the signal that the sent-site operational block 124 initially produced. This result is the output of the peak detector 314 and is passed on to a receive-site operational block 324 performing substantially the same operation as sent-site operational block 124. To this end, a pseudo-noise generator 322 is connected with operational block 324 to provide a pseudo-noise as a second input. The pseudo-noise generated by pseudo-noise generator 322 is produced by a process that is governed by the same law as used in sent-site pseudo-noise generator 122. Furthermore, pseudo-noise generator 322 is synchronized to the pseudo noise generator 122 of the transmitter. The synchronization can be effected for example by means of a phase locked loop or the like. The result of operational block 324 is an output signal 301 which can be assumed to be equivalent to input signal 101 with a high reliability.

Figure 4:
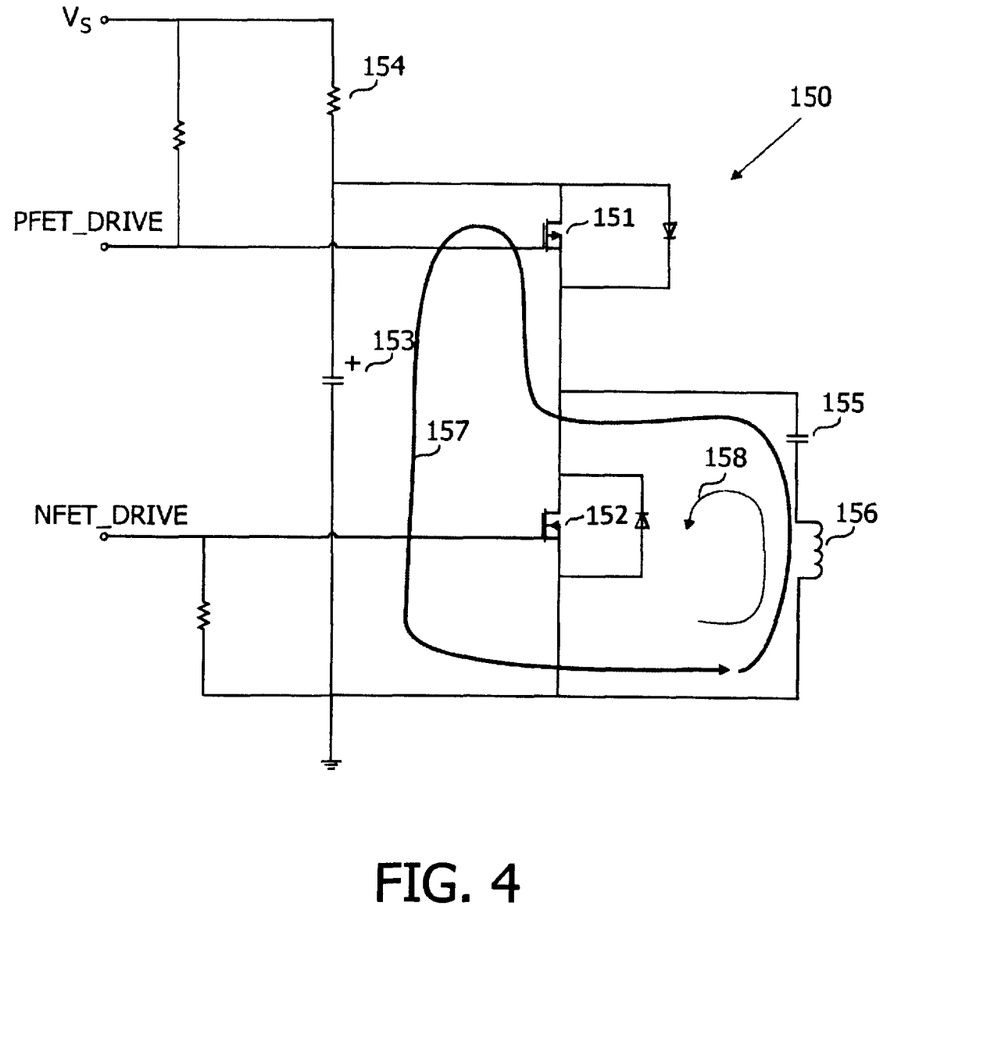
FIG. 4 is a schematic diagram illustrating a transmitter circuit for use with the present invention.

Turning now to FIG. 4, output stage 150 of transmitter 100 is shown more in detail. The two input ports of the circuit PFET_DRIVE and NFET_DRIVE are connected to pulse-code modulator 110. The output signal of pulse-code modulator 110 is coupled to one of the two input ports, while an inverted signal of the output signal of pulse code modulator 110 is connected to the other of the two input ports. The two resistors are simply pull-up and pull-down resistors, respectively, as well known in the art. Each of the two input ports is coupled to the gate of one of two transistors 151 and 152, respectively. In particular, input port PFET_DRIVE is coupled to p-channel MOSFET transistor 151 and input port NFET_DRIVE is coupled to n-channel MOSFET transistor 152. The drain of transistor 151 is coupled to a supply voltage via a resistor 154, while the source of transistor 152 is coupled to ground voltage. A capacitor 153 is provided for stabilizing the voltage across transistors 151 and 152. Capacitor 153 also serves a storage element for electrical charge. The source of transistor 151 and the drain of transistor 152 are coupled together and both connected to a series resonant circuit comprising a resonant circuit capacitor 155 and an resonant circuit inductance 156. The other end of the series resonant circuit is connected to ground voltage. Transistors 151 and 152 are operated in alternating mode, that is, only one is made conducting at a time by applying an appropriate drive voltage at the gate of the respective transistor. Hence, two phases can be distinguished: a charging phase and a discharging phase. During the charging phase, transistor 151 is conducting, which means to the supply voltage being applied to the series resonant circuit resistor 154, capacitor 155, and inductance 156 now forming a damped resonant circuit, a current flows through the mentioned elements as well as transistor 151 that is governed by the supply voltage and the oscillating behavior of the damped series resonant circuit. Accordingly, it can be expected that an oscillating current builds up in the resonant circuit. Arrow 157 indicates the path of current, although it should be understood that the current actually flows in both directions, since it is an oscillating current. During the discharging phase, transistor 151 is non conducting, while transistor 152 is conducting. The current that was previously built up during the charging phase now decays due to internal resistances of the capacitor 155, the inductance 156 and the transistor 152. The path of current during the discharging phase is indicated by arrow 158. As in the case of the charging phase, the current, being an oscillating current, actually flows in both directions.

Figure 5A:
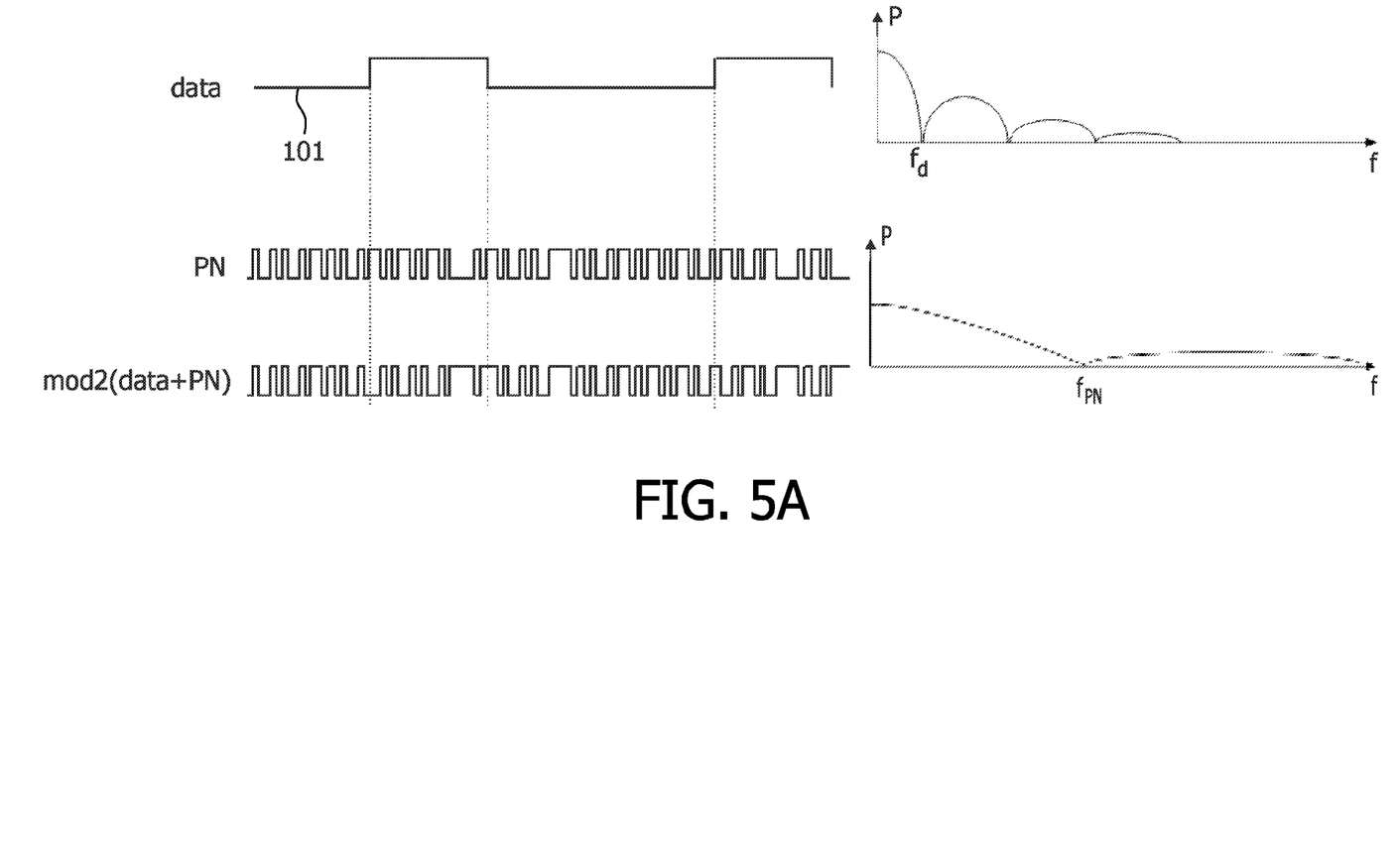
FIGS. 5A and 5B are illustrations of the different signals of their respective spectral power densities appearing in a transmitter according to the present invention.
Figure 5B:
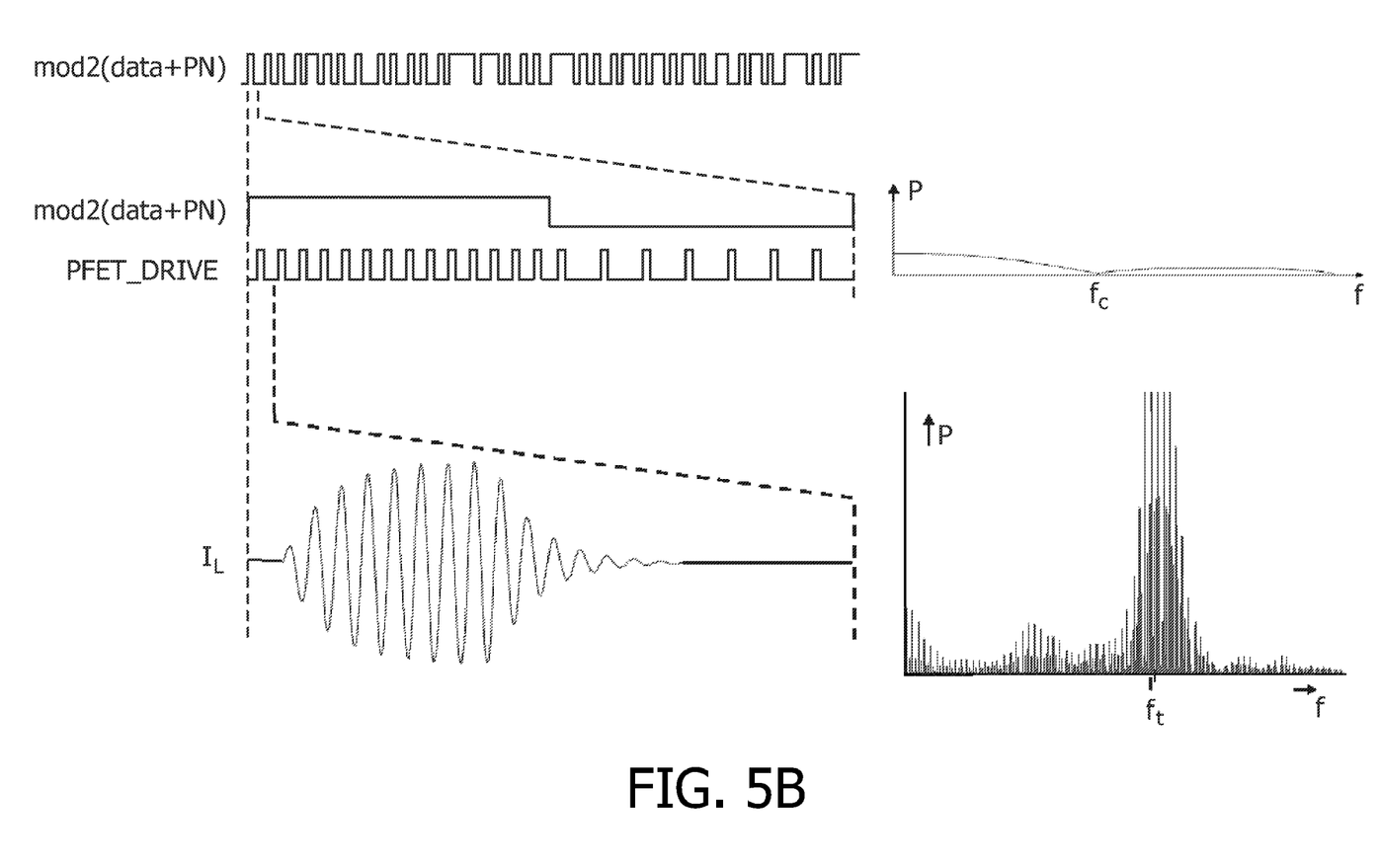

FIGS. 5A and 5B illustrate several signals that occur within transmitter 100, as well as their respective spectral power distributions. In FIG. 5A the first signal is the signal carrying the binary data to be transmitted. If this input data signal has a bit rate of $f_d$, the spectral power distribution is indicated to the right of the signal as a sinc$^2$ function having its first root or minimum at $f_d$. In accordance with FIG. 2, this signal undergoes a binary operation at operational block 124, in which the data input signal 101 is merged with a pseudo-noise signal PN produced by pseudo-noise generator 122. In FIG. 5A the pseudo-noise signal is represented as the second signal. The PN signal is a pseudo-noise random sequence. This sequence can be a maximum length sequence or a Gold sequence with a chip rate $f_{PN}$. The spectral power distribution of the pseudo-noise signal is represented to the right of the signal in FIG. 5A. Again, it is a $sinc^2$ function having its first minimum at $f_{PN}$. The operation may be an addition of the two signals with subsequent modulo 2 operation or an XOR operation. The result is represented in FIG. 5A as the third signal from the top, which at first sight resembles the pseudo-noise signal PN. However, compared to the pseudo-noise signal, the resulting signal changes its phase whenever the input data signal changes its phase. Since the modulation of two signals that both have a spectral power distribution in $sinc^2$ form, results in a signal having a $sinc^2$ spectral power distribution with the first minimum at a frequency that equals the higher frequency of the two modulation frequencies involved in the operation, the spectral power distribution of the resulting signal mod 2(data+PN) equals the spectral power distribution of the pseudo-noise signal PN.

In FIG. 5B the resulting signal mod 2(data+PN) is repeated for illustration and orientation purposes. The second signal from the top of FIG. 5B is a magnified section of the resulting signal mod 2(data+PN), in which two bits are represented, one of which having the logical value "1", the other having the logical value "0". This signal is passed on to modulator 110 of FIG. 2. Within modulator 110, the signal is modulated into a signal having the name PFET_DRIVE, indicating that this signal drives p-channel MOSFET 151 of FIG. 4. For exemplary purposes, a particular modulation is now described, but it should be understood that many possible modulation schemes exist. If the signal mod 2(data+PN) has the instantaneous logical value "1", then modulator 110 produces a sequence of 13 square pulses as indicated by FIG. 3A. If the logical value of the signal mod 2(data+PN) is "0" at some instant, modulator 110 produces a sequence of seven square pulses. In other words, in the case of a logical "0", every other square pulse of the modulated signal corresponding to a logical "1" is replaced by a blank line as depicted in FIG. 3B. The signal PFET_DRIVE has a spectral power distribution indicated by the diagram to the right of the signal. Again, it is a $sinc^2$ function having its first minimum at the pulse code frequency $f_c$. It should be noted that the pulse code frequency $f_c$ changes as a function of the logical value of the signal mod 2(data+PN). In the described example, $f_c$ in the case of a logical "1" is about the double $f_c$ in the case of a logical "0", because of the higher number of square pulses. The fourth and lower most signal in FIG. 5B is the resulting current through inductance 156, when the resonant circuit comprising capacitor 155 and inductance 156 is excited by a single square pulse signal PFET_DRIVE. It can be seen that the current oscillates at a certain frequency $f_t$, which stands for transmission frequency. It can also be seen that current $I_L$ increases in amplitude while the square pulse of PFET_DRIVE is active and that current $I_L$ decreases in amplitude as soon as the square pulse of PFET_DRIVE is inactive.

A current flowing through an inductance such as inductance 156 induces a magnetic field or B-field. Therefore, inductance 156 can also be used as a transmission element emitting a B-field, which may be picked up by an appropriate receiving element, such as another inductance. The current $I_L$ through inductance 156 and the B-field have a spectral power distribution as it is illustrated to the right of the representation of current $I_L$. The main lobe is centered around the transmission frequency $f_t$, which can also be regarded as the carrier frequency of the transmission system. Furthermore, it can be seen that the spectrum of inductance current $I_L$ is a line spectrum with clear spectrum lines that are spaced from the carrier frequency $f_t$ by pulse-code frequency $f_c$.

Figure 6A:
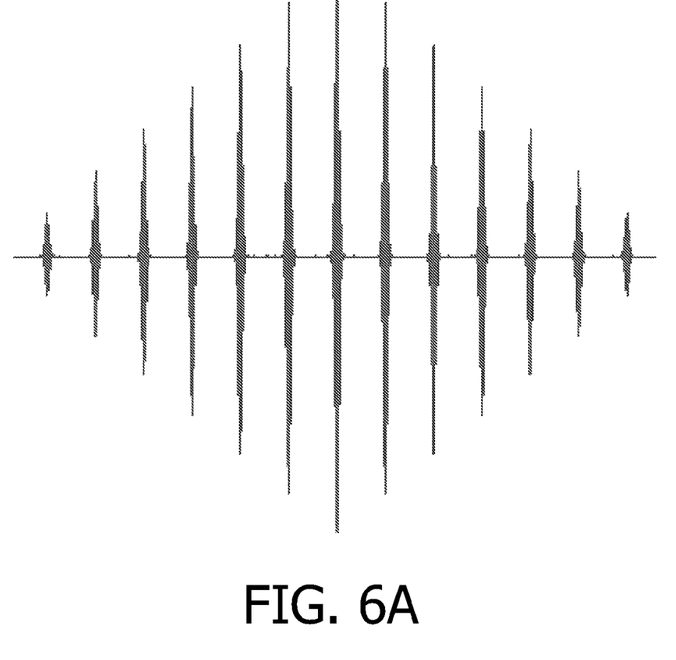
FIGS. 6A and 6B represent an auto correlation function and a cross correlation function, respectively, of signals transmitted between a transmitter and a receiver of a transmission system according to the present invention.

FIG. 6A shows the auto-correlation of inductance current $I_L$ while transmitting a logical "0". If the inductance current $I_L$ during transmission of a logical "0" is chosen as the previously mentioned reference signal, the cross correlation between a signal that is received by a receiver and the reference signal can be expected to resemble the auto-correlation represented in FIG. 6A.

Figure 6B:
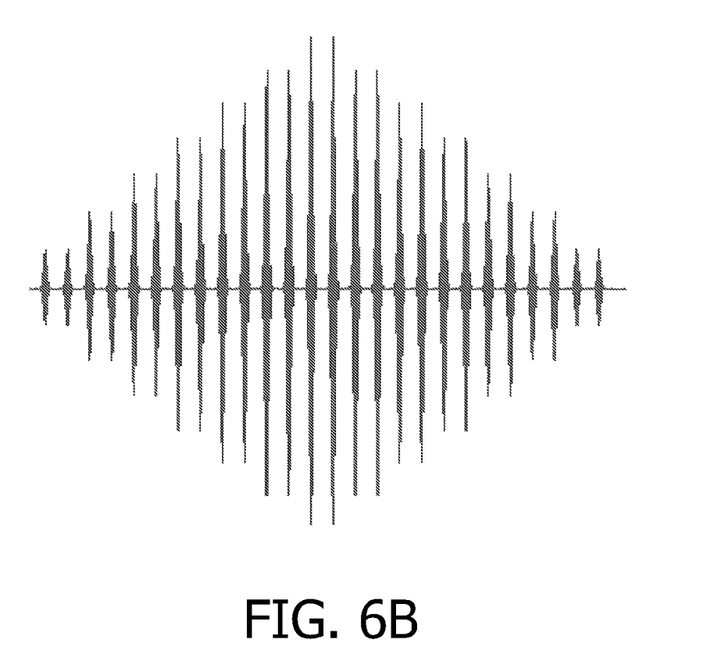

FIG. 6B on the other hand represents the cross correlation between low signal and high signal, wherein low signal means the wave form of inductance current $I_L$ while transmitting a logical "0". Similarly, high signal means the wave form of inductance current $I_L$ while transmitting a logical "1". When comparing FIG. 6B to FIG. 6A, it can be observed that each peak of the auto-correlation of FIG. 6A is duplicated in the cross-correlation represented by FIG. 6B. Because of the correlation properties of this wave form, correlation using a simple peak detector and counting the peaks or determining the time between the peaks delivers the bits to be decoded. These bits are decoded into the original data bits by using a synchronized PN sequence generator and adding the bits from the PN sequence modulo-2 to the output of the peak detector.

As will be appreciated by those skilled in the art, a transmission system according to the present invention features a simple and low power consuming transmitter. The receiver having a higher performance is capable of reliably detecting the original data bits. Because of the fact that the transmitter is less complicated than the receiver, the transmission system may be called an "asymmetrical transmission system".

Obviously, numerous modifications end variations of the present invention are possible in light of the above teachings. In particular, the present invention may be used with a variety of transmission techniques, such as (far field) radio-frequency transmission systems, optical transmission systems, and transmission systems using sound waves as a carrier. It is therefore to be understood that within the scope of the appended claims, the invention may be practiced otherwise than as specifically described herein.

The invention claimed is:

1. A transmitter comprising:
   a pseudo noise generator which provides a pseudo noise signal;
   a spread spectrum coder which receives an input signal and the pseudo noise signal and combines the input signal and the pseudo noise signal to generate a spread spectrum signal at a signal output port;
   a pulse code modulator having a signal input port connected to the signal output port of the spread spectrum coder to pulse code modulate the spread spectrum coded signal, yielded by the spread spectrum coder, into a pulse-code modulated signal on a pulse code modulator output; and
   an output stage connected to an output of the pulse code modulator output to output the pulse code modulated signal to a transducer for transmission.

2. The transmitter according to claim 1, wherein the pulse code modulator modulates an instantaneous value of the spread spectrum coded signal into a sequence that is part of the pulse-code modulated signal.

3. The transmitter according to claim 1, further comprising:
a resonant circuit and a switch which alternatingly energizes and de-energizes the resonant circuit in response to a signal generated by the modulator.

4. The transmitter according to claim 3, wherein the resonant circuit has a resonance frequency in a long wave range.

5. The transmitter according to claim 1, wherein the transducer includes:
a magnetic transducer such that the transmitted pulse code modulated signal has a magnetic field component.

6. A demodulator for a communications system, the demodulator corresponding to a transmitter within said communications system and comprising:
a correlator which performs a correlation of a received signal and a reference signal, the reference signal being representative of a system response of the transmitter when excited by a particular pulse-code modulated sequence, the particular pulse-code modulated sequence being representative of a selected pulse-code modulated value;
a peak detector, an input port of the peak detector being connected to an output port of the correlator; and
a spread spectrum decoder, an input port of the spread spectrum decoder being connected to an output port of the peak detector.

7. A data transmission system for healthcare applications comprising:
an on-body transmitter for mounting adjacent a body which absorbs E-field signals and propagates B-field signals, the transmitter including:
a sent-site spread spectrum encoder which receives a data signal and encodes the data signal into a spread spectrum signal,
a sent-site pulse-code modulator which receives the spread spectrum signal and encodes it into a pulse code modulated signal,
an output stage which receives the pulse code modulated signal and applies the pulse code modulated signal to a transmit transducer to transmit a B-field signal; and
a demodulator including:
an input circuit connected with a receive transducer to receive the transmitted B-field signal,
a pulse code demodulator which demodulates the B-field signal to generate a pulse code demodulated signal, and
a spread spectrum decoder which decodes the pulse code demodulated signal to recover the data signal.

8. The data transmission system according to claim 7, wherein the on-body transmitter output circuit includes:
a resonant circuit; and
a switch which alternatingly energizes and de-energizes the resonant circuit in response to the pulse code modulated signal encoded by the pulse-code modulator.

9. The data transmission system according to claim 7, wherein the pulse-code demodulator includes:

a correlator that generates a correlated signal from the received signal; and
a peak detector connected to the correlator to receive the correlated signal and with the spread spectrum decoder to supply the pulse code demodulated signal thereto.

10. A method for transmitting data from a transmitter to a receiver comprising:
performing a spread spectrum encoding on a signal representative of said data yielding a spread spectrum coded signal;
performing a pulse code modulation on the spread spectrum coded signal yielding a pulse-code modulated signal;
transmitting the pulse-code modulated signal;
receiving the transmitted pulse-code modulated signal;
performing a correlation of the pulse-code modulated signal and a reference signal to obtain a cross-correlation, the reference signal being representative of a system response of the transmitter when excited by a pulse-code modulated sequence, the pulse-code modulated sequence being representative of a selected value out of possible values of the spread spectrum coded signal;
performing a peak detection on the cross-correlation.

11. The method according to claim 10, further comprising:
prior to transmitting the pulse-code modulated signal, alternatingly energizing and de-energizing a resonant circuit in response to the pulse-code modulated signal.

12. The method according to claim 11, further including:
locating the transmitter close to a body that absorbs E-fields.

13. A communications system for operating near a body that absorbs electrical field signals, the communications system comprising:
a transmitter; and
a demodulator including:
an input circuit connected with a receive transducer to receive a transmitted pulse-coded signal,
a pulse code demodulator which demodulates the transmitted pulse-coded signal to generate a pulse code demodulated signal, and
a spread spectrum decoder which decodes the pulse code demodulated signal to recover a data signal.

14. The communications system for operating near a body that absorbs electrical field signals according to claim 13, wherein the transmitter includes:
a spread spectrum coder which generates a spread spectrum coded signal from a data signal carrying data to be transmitted;
a pulse code modulator having an input connected to an output of the spread spectrum coder to pulse code modulate the spread spectrum coded signal;
a transmit transducer;
an output stage which receives the pulse-coded signal from the pulse code modulator and applies the pulse-coded signal to the transmit transducer.

* * * * *